UNITED STATES PATENT OFFICE.

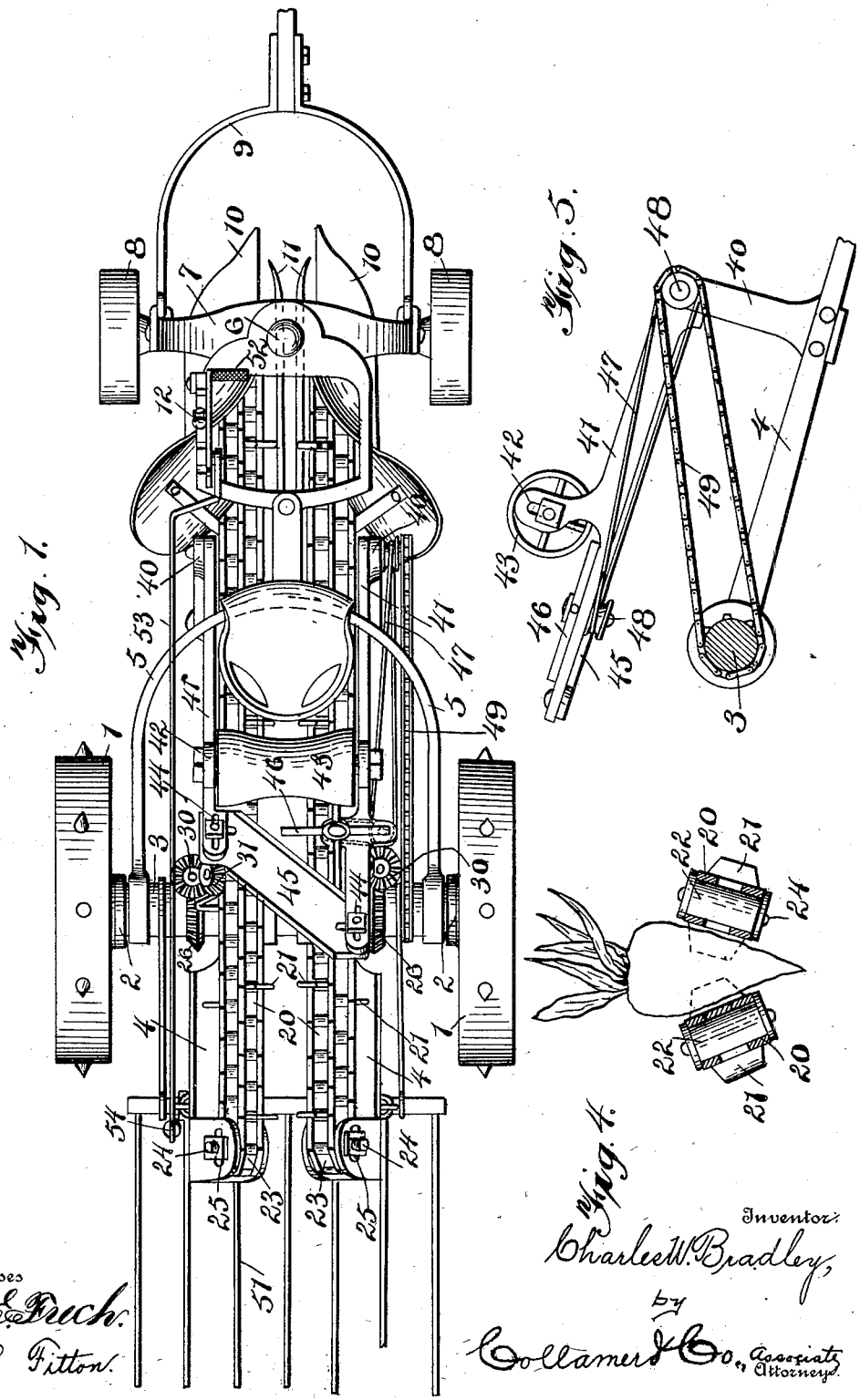

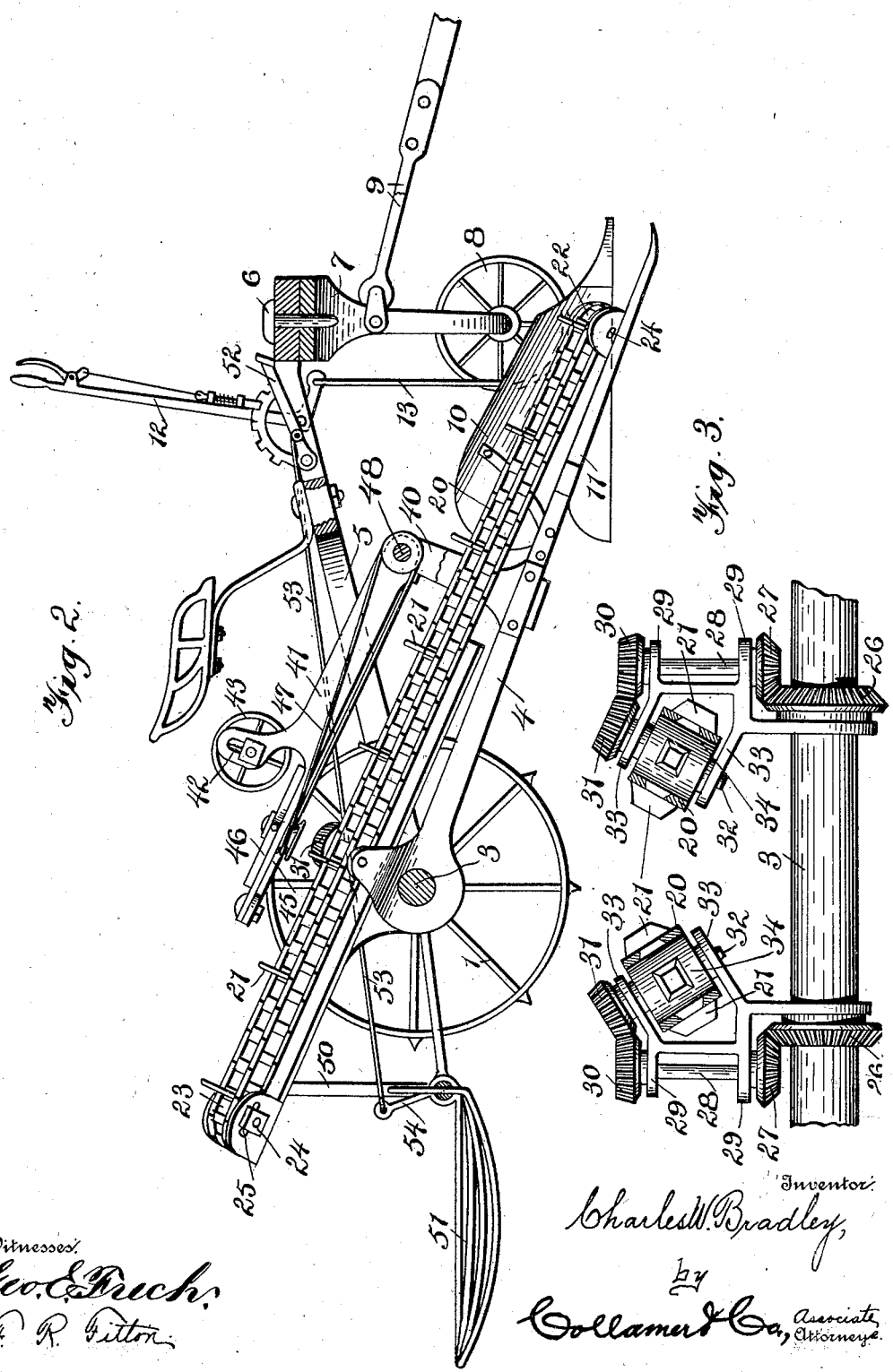

CHARLES W. BRADLEY, OF LYONS, NEW YORK.

SUGAR-BEET PULLER AND TOPPER.

SPECIFICATION forming part of Letters Patent No. 696,934, dated April 8, 1902.

Application filed June 29, 1901. Serial No. 66,555. (No model.)

*To all whom it may concern:*

Be it known that I, CHARLES W. BRADLEY, a citizen of the United States, residing at Lyons, in the county of Wayne and State of New York, have invented certain new and useful Improvements in Sugar-Beet Pullers and Toppers, of which the following is a specification.

This invention relates to harrows and diggers, and more especially to machines such as are intended to dig the sugar-beet, cut off its top, and deliver the vegetable proper; and the object of the same is to produce certain improvements in a machine of this character.

To this end the invention consists in the construction described below and illustrated in the accompanying drawings, wherein—

Figure 1 is a plan view of the machine entire. Fig. 2 is a central longitudinal section. Fig. 3 is a cross-section just forward of the main axle, showing the gearing for driving the endless carrier. Fig. 4 is a sectional detail through the endless carrier near its forward ends. Fig. 5 is a sectional detail of the topping apparatus detached.

In the drawings, 1 1 are the main wheels, connected by backing-ratchets 2 with the main axle 3, on which are mounted the main framework 4 and the seat-support 5. The latter is carried upward and forward to a kingbolt 6, having pivotal engagement with an arch 7, carrying the front wheels 8 and the propelling mechanism 9. No especial claim is made on the construction of this framework; but it is preferably built about as described in order to support the working parts of the machine.

10 10 are two plows spaced a little apart and carried at the lower front end of the framework 4, and between these plows is located a pair of fingers 11, whose bodies are substantially parallel and whose front ends diverge, as best seen in Fig. 1. A hand-lever 12, mounted on the seat-support 5, is connected by a rod 13 with that portion of the framework 4 which carries the plows 10 and fingers 11, and by adjusting this lever the digging mechanism may be set to enter the earth to the desired degree. The plows obviously throw the dirt away from the beets and they are picked up by the points of the fingers and moved upward over the bodies thereof.

Two endless chains 20 are provided, each having spurs 21 and each moving around a pair of rollers 22 and 23, located, respectively, at the lower front end and the upper rear end of the framework, with their axes 24 inclined toward each other, so that the inner working faces of the chains shall stand oblique to each other and slightly separated, as best seen in Fig. 3. These chains are, if anything, at a little greater angle to each other near their front ends than elsewhere, as seen in Fig. 4. The axle or pivot 24 of each rearmost roller is mounted in a slotted bearing 25, so that this roller can be adjusted to take up looseness in the belt.

Secured to the main axle 3 at opposite sides of the center of the machine are miter-gears 26, engaging others numbered 27, which are on the lower ends of upright counter-shafts 28, mounted in suitable bearings 29. At the upper ends of said shafts are other gears 30, meshing with similar gears 31, mounted on oblique shafts 32, also journaled in suitable bearings 33, which stand at the upper and lower edges of the chains 20, and on each shaft 32 within the bearing 33 is fixed a spurwheel 34, whose teeth engage both sides of the chain belt and give it the proper motion through this connection with the main shaft. Although such is my preferred construction of the means for driving the endless carrier, other arrangements might be adopted without departing from the spirit of the invention. This mechanism applies the power midway of the length of each carrier and to the downwardly-moving as well as to the upwardly-moving side thereof, and double force is thus exerted, while outward sagging of the active side of the chain belt at this point is prevented. The beets, sliding upward on the bodies of the fingers 11, are engaged between the active sides of the two chains, with the assistance of the spurs 21, and are carried upward and rearward over the machine.

To the upper ends of two standards 40, rising from the main frame 4, is pivoted a frame 41, having slotted bearings 42, within which is adjustably mounted the shaft of a roller 43, whose slightly-dished active face stands across the center of the machine above the opening between the two chains. The arms of the frame 41 are continued to the rear and are slotted, as at 44, for the adjustable attachment of an oblique knife 45, also extending across the center line of the machine and standing a little in rear of and a little below the lower face of said roller.

46 is a header whose shaft is journaled in one of the side arms of the frame 41 and whose fingers extend into the space between the roller and knife and practically across and above the space between the two chains. Said shaft has a pulley connected by a belt 47 with a pulley mounted on the pivot 48, which supports the frame 41 from the standard 40, and this pulley has a toothed portion which in turn is connected by a chain belt 49 with a similar spur-wheel on the main axle 3. Thus the rotation of the axle through the two belts 49 and 47 causes the rotation of the header, whose fingers hold the tops of the beets upright and press them to the rear against the cutting edge of the knife 45. By this means the beets are topped, being relieved of the tops proper and of so much of the upper portion of the vegetable as grows out of the ground, and hence contains no sugar; and after the tops are removed the feeder throws them off to one side. The roller 43 is intended to be adjusted within the bearings 42, so as to support the entire frame 41 and hold the knife 45 at a proper height to do the topping at the point desired.

In a suitable support 50 hanging from the rear of the framework is pivotally mounted a basket 51, whose body stands beneath the rear end of the carrier and receives the beets while permitting the dirt to fall through. The tops are carried along upward by the chains and thrown off at one side of the machine by the header 46. At proper intervals the basket is let down through the instrumentality of a foot-lever 52, located at a convenient point adjacent the driver's seat and connected by a rod 53 with an arm 54 fast on the shaft of the basket.

The parts are of the desired sizes, shapes, proportions, and materials, though preferably all of metal, save possibly the roller and the belt 47. However, I do not wish to be limited to the precise details of construction, as considerable change may be made without departing from the principle of my invention.

As above explained, the plows open the earth, the fingers pick up the beets, the chains grasp and carry them upward, the roller holds the topper and header at the proper height, these elements perform their work, the beet-tops are dropped at the rear of the machine, the vegetables are delivered into the basket and the dirt shaken off, and from time to time the operator drops them in a pile. However, the basket might be omitted and a bag hung under the rear end of the carrier to receive the vegetables. The hand-lever is useful in adjusting the depth at which the plows shall work or for raising them entirely out of the earth when the machine is to be transported from point to point.

What is claimed as new is—

1. In a beet-harvester, the combination with a pair of spaced plows, a pair of spaced fingers between the plows and whose front ends spread outward, and a carrier comprising a pair of endless chains whose inner active sides stand above the fingers and at an angle to each other and have spurs projecting toward each other; of connections between the main axle and chains for imparting movement to the latter, and means for raising and lowering the plows and the fingers, all substantially as described.

2. In a beet-harvester, the combination with a pair of spaced plows and a pair of spaced fingers all mounted on the framework of the machine, two pairs of axles oblique to each other, means for adjusting one of each pair, and endless chains mounted on rollers on said axles with their active sides spaced and leading from over the fingers upward to the rear of the machine; of a spur-wheel located within each chain about midway between its rollers, and connections between the shaft of this wheel and the main axle, all substantially as described.

3. In a beet-harvester, the combination with the main framework, and the digging mechanism at the forward end thereof; of a carrier comprising two endless chains whose active sides are spaced and stand oblique to each other, rollers in the bends of these chains, and for each chain a spur-wheel between its sides about midway of its length, a bearing supporting the shaft of this wheel and standing against the edges of the chain, a counter-shaft in a bearing, intermeshing gears connecting the two shafts, and gearing also between the counter-shaft and the main axle of the machine, all as and for the purpose set forth.

4. In a beet-harvester, the combination with the digging mechanism, and a carrier for conveying the beets therefrom; of a topping-knife located above the carrier and supported by a movable frame, and a roller in said frame resting on the beets, as and for the purpose set forth.

5. In a beet-harvester, the combination with the digging mechanism, and a carrier for conveying the beets therefrom; of a topping-knife located above the carrier, a frame for the knife pivoted to standards on the main framework and having slotted bearings, and a roller extending across the carrier and whose shaft is adjustably mounted in said bearings, as and for the purpose set forth.

6. In a beet-harvester, the combination with the digging mechanism, and a carrier for conveying the beets therefrom; of a frame pivoted to standards rising from the main framework, a topping-knife and a roller carried by said frame, a header whose shaft is journaled in the frame and whose arms operate between the roller and knife, and connections between said header-shaft and the main axle of the machine, substantially as described.

7. In a beet-harvester, the combination with the digging mechanism, and a carrier for conveying the beets therefrom; of a frame pivoted to standards rising from the main framework, a topping-knife and a roller carried by said frame, a header whose shaft is journaled in the frame and whose arms operate between the roller and knife, a pulley and sprocket journaled on the pivot between one side bar of the frame and its standard, a belt connecting this pulley with a pulley on the header-shaft, and a chain belt connecting this sprocket with a sprocket on the main axle, as and for the purpose set forth.

8. In a beet-harvester, the combination with the digging mechanism, and a carrier for conveying the beets therefrom; of a frame pivoted to standards rising from the main framework, a roller standing across the carrier and whose shaft is vertically adjustable in bearings in said frame, a knife extending obliquely across above the carrier and whose extremities are adjustably bolted in slots in said frame, a header whose shaft is journaled in the frame and whose arms operate between the roller and knife, and connections between said header-shaft and the main axle of the machine, all substantially as and for the purpose set forth.

In testimony whereof I affix my signature in presence of two witnesses.

CHARLES W. BRADLEY.

Witnesses:
GRACE E. McNEILL,
MARY E. WHITMAN.